April 21, 1936.  H. C. HARRISON ET AL  2,038,216
SUPPORT FOR VIBRATION TRANSLATING DEVICES
Filed Dec. 29, 1934  2 Sheets-Sheet 1
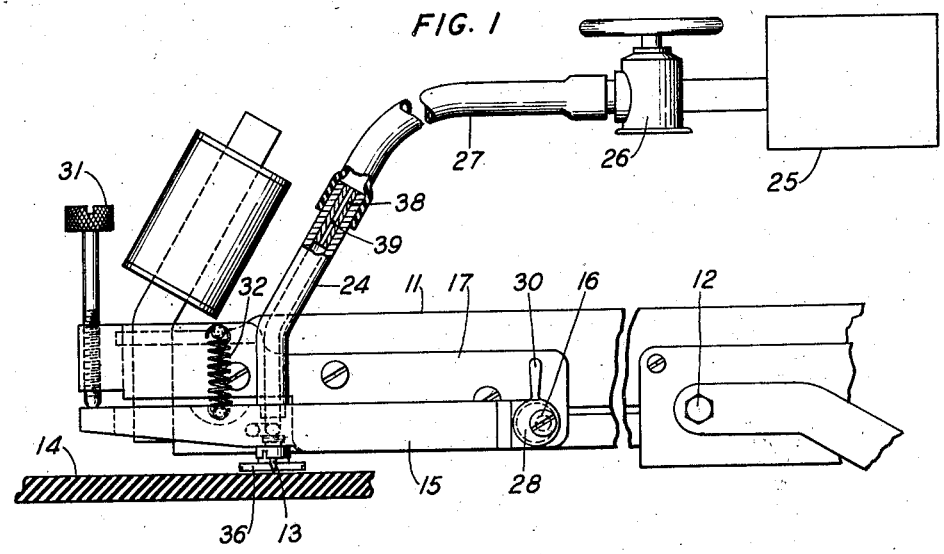
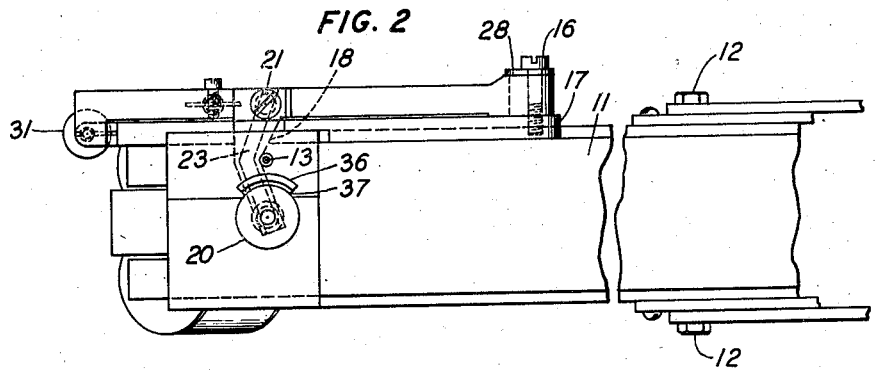
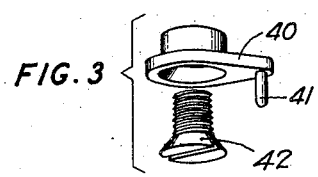
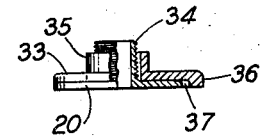
INVENTORS: H.C. HARRISON
A.C. KELLER
BY
ATTORNEY April 21, 1936. H. C. HARRISON ET AL 2,038,216
SUPPORT FOR VIBRATION TRANSLATING DEVICES
Filed Dec. 29, 1934 2 Sheets-Sheet 2
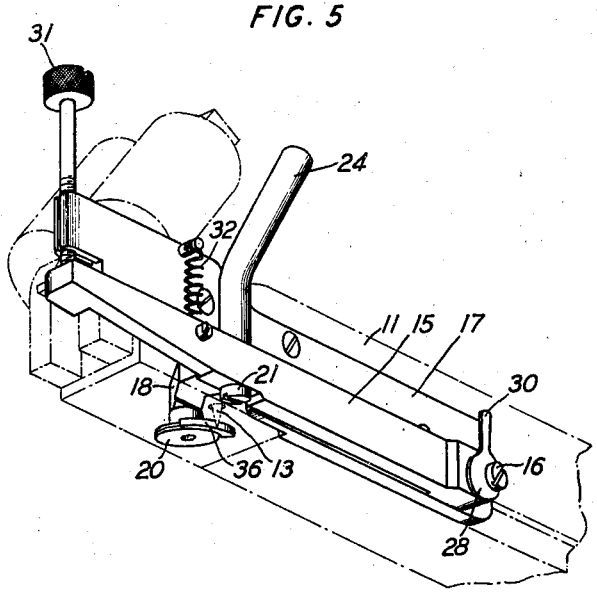
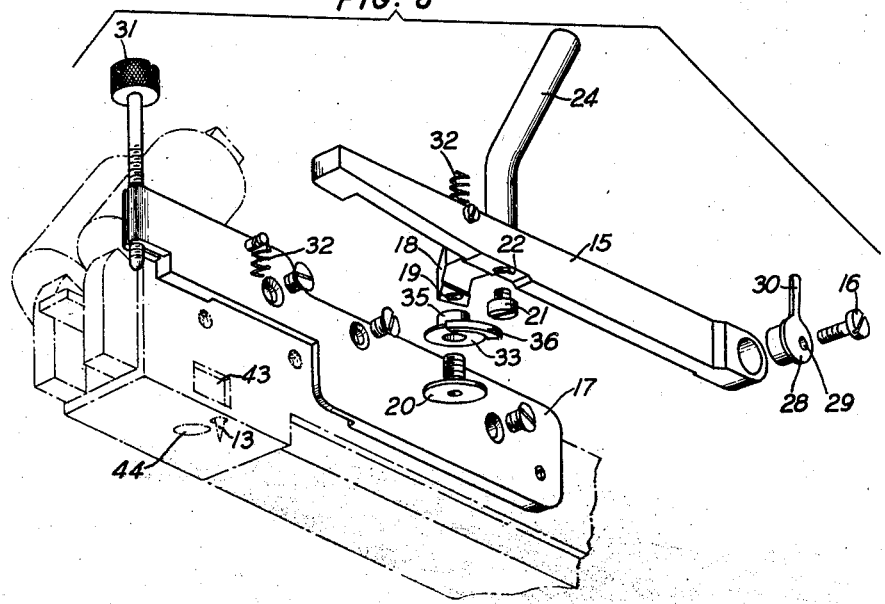
INVENTORS: H.C. HARRISON
A.C. KELLER
BY
*G. M. Campbell*
ATTORNEY Patented Apr. 21, 1936

2,038,216

UNITED STATES PATENT OFFICE 2,038,216

SUPPORT FOR VIBRATION TRANSLATING DEVICES

Henry C. Harrison, Port Washington, and Arthur C. Keller, Mount Vernon, N. Y., assignors to Bell Telephone Laboratories, Incorporated, New York, N. Y., a corporation of New York Application December 29, 1934, Serial No. 759,682

6 Claims. (Cl. 274—1)

This invention relates to sound recording and reproducing systems and the object of the invention is an improved structure for supporting translating devices such as recorders or reproducers.

In a copending application of A. C. Keller and I. S. Rafuse, Serial No. 731,428, filed June 20, 1934, now Patent No. 1,990,548, there is disclosed a system for supporting these devices in operative relation to a record member which comprises essentially a fluid conduit on the device terminating in a flange parallel to the record and means for supplying to the conduit a fluid, such as compressed air, which flows radially outward between the flange and the record surface and sets up a balanced system of forces for maintaining the stylus of the device at the proper level with respect to the record surface.

In the supporting system of this invention the fluid conduit is secured to an arm eccentrically pivoted at one side of the device and having two identical orifices for receiving the flange, one on each side of the stylus. The flange is attached to one of the orifices and the other is closed by a suitable plug, the choice of orifices for the flange depending on whether the device is to move radially inward or radially outward on the record. The arm is preferably spring pressed against an adjusting screw and the eccentric pivot provides a convenient means for bringing the flange into exact parallel relationship with the record surface.

According to a further feature of the invention, the fluid conduit has a portion of restricted cross section which passes freely the flow of fluid necessary to maintain the flange in equilibrium above the record, but limits the excessive flow which would otherwise occur when the stylus is lifted from the record.

These and other features of the invention will be more clearly understood from the following detailed description in the accompanying drawings, in which:

Fig. 1 is a side view of a disc recorder equipped with an improved air advance ball according to the invention;

Fig. 2 is a bottom view of the recorder;

Fig. 3 is a mechanical advance ball which can be used with the recorder;

Fig. 4 is a detail view of the flange and the trap for deflecting the air from the stylus;

Fig. 5 is a perspective view of the air advance ball mechanism; and

Fig. 6 is an exploded view of the air advance ball mechanism.

The translating device 11 shown for purposes of illustration is a recorder of a well-known electromagnetic type mounted on a horizontal pivot 12 with the cutting stylus 13 in position on the recording surface 14. The arm 15 is pivotally mounted by the screw 16 on a plate 17 secured to the side of the recorder housing and has a projection 18 extending laterally through the opening 43 in the housing around the stylus and having a threaded hole 19 above the opening 44 in the housing for receiving the flange 20 or the plug 21. A similar threaded hole 22 is provided in the bottom of the arm and an air path 23 connects the holes 19 and 22 with the tube 24 on the upper side of the arm.

This tube is connected to a suitable source 25 of compressed air through a pressure reducing valve 26 by a flexible tube 27. The arm 15 is fitted with a plug 28 having an eccentric hole 29 for the screw 16 and a projecting handle 30 for rotating the plug to provide vertical adjustment in the pivot mounting of the arm. At the front of the recorder, the plate 17 is fitted with an adjusting screw 31 for rotating the arm about its pivot and against which the arm is held by the tension of the spring 32.

Better results can usually be obtained with the air advance ball by mounting the flange so that it moves ahead of the stylus across the uncut portion of the recording surface. This condition is readily obtained with this invention for recorder movement in either direction since the flange 20 and the plug 21 are interchangeable. In order to prevent the air escaping between the flange and the record surface from producing a modulating effect on the vibrations of the stylus, an improved adjustable air trap is provided. As shown more clearly in Figs. 2 and 4, the disc 33, which fits loosely over the threaded tubular portion 34 of the flange 20, has a boss 35 which engages the arm 15 and a segment 36 projecting downwardly to the plane of the face of the flange to form a groove 37. In connecting the flange to the arm in either position the disc 33 is turned so that the segment 36 lies between the flange and the stylus. The groove 37 provides a path of low impedance as compared with the path between the recording surface and the segment 36 and the greater part of the air flowing toward the stylus is therefore deflected by the segment and escapes through the ends of the groove.

When using a mechanical advance ball it is not always necessary to adjust the axis of the recorder to accurate parallel relationship to the plane of the recording surface but with the air advance ball the face of the flange should be positioned with considerable care. This is conveniently accomplished with the flange in either position by means of the rotatable plug 28 and the screw 31 described above.

The air supplied to the tube 24 at a suitable pressure (within the range of about 5 to 15 pounds gauge pressure) passes through the arm 15 to the flange 20 and radially outward between the flange and the recording surface. As explained more fully in the application referred to above, this radial flow of air sets up a balanced system of forces so that the recorder is supported in stable equilibrium with the flange a few mils above the recording surface. In order to prevent an objectionable rush of air and excessive noise when the recorder is being placed on the record or lifted therefrom while the valve 26 is open, there is provided between the valve and the flange and preferably in the tube 24 a flow restricting device 38. This may take the form of a plug, one-half inch to one inch in length with a hole 39 of materially smaller bore than the tube. The dimensions of the plug are not critical but it should have sufficient impedance to limit the free flow of air to a satisfactory degree but should pass enough air for normal operating purposes. For example, when using the conventional recorder shown with a flange one-half inch in diameter, a tube bore of 0.113 inch and a pressure of 10 pounds per square inch applied to the tube, a plug one-half inch long with a bore of 0.063 inch was found to reduce the noise of the free flow of air about 25 decibels.

When compressed air is not available or if for some other reason it is desirable to use a mechanical advance ball, this may be done without change in the recorder structure by providing a member 40 in which a mechanical advance ball 41 is fitted as shown in Fig. 3. The screw 42 fits either of the holes 19 or 22 so that the ball 41 can be secured in either operating position as the case requires.

While the invention has been described with reference to its use with a particular recorder it will be understood that it is equally applicable to reproducers or other devices to be supported in accurate relationship to moving surfaces.

What is claimed is:

1. The combination with a record, a vibration translating device cooperating therewith, a fluid conduit on the device having a flange in close spaced relation to the record and means for producing a flow of fluid between the flange and the record for maintaining the space between them, of a section of restricted area in the conduit for limiting the flow of fluid when the device is lifted from the record.

2. The combination with a record, a vibration translating device cooperating therewith, a fluid conduit on the device having a flange in close spaced relation to the record and means for producing a flow of fluid between the flange and the record for maintaining the space between them, of a support for the conduit and an eccentric pivot for the support for adjusting the face of the flange into parallel relationship with the surface of the record.

3. The combination with a record, a vibration translating device having a stylus cooperating therewith and a flange, of means for mounting the flange in close spaced relation to the record on either side of the stylus, and means for producing a flow of fluid radially of the flange in either position.

4. The combination according to claim 3 in which the flange is threaded into the conduit and is provided with an air trap along a portion of its periphery, the trap being rotatably adjustable with respect to the flange.

5. The combination according to claim 3 in which the flange mounting means is secured to the device by an eccentric pivot for adjusting the flange into parallel relationship to the record.

6. The combination with a record, a vibration translating device having a stylus cooperating therewith, a flange and means for producing a flow of fluid radially of the flange to support the device, of means for mounting the flange on the device comprising an arm pivotally mounted on one side of the stylus and having a fluid conduit extending to the other side of the stylus, means for attaching the flange to the conduit at either side of the stylus, means for rotating the arm on its pivot mounting, and means for vertically adjusting the pivot.

HENRY C. HARRISON.
ARTHUR C. KELLER.